United States Patent
Werjefelt

(10) Patent No.: US 8,901,766 B2
(45) Date of Patent: Dec. 2, 2014

(54) WAVE ACTION ELECTRIC GENERATING SYSTEM INCLUDING A BOOM ON A FLOATING PLATFORM

(76) Inventor: Alexander K. Werjefelt, Kaneohe, HI (US)

( * ) Notice: Subject to any disclaimer, the term of this patent is extended or adjusted under 35 U.S.C. 154(b) by 482 days.

(21) Appl. No.: 12/457,520

(22) Filed: Jun. 12, 2009

(65) Prior Publication Data

US 2009/0322092 A1 Dec. 31, 2009

Related U.S. Application Data

(60) Provisional application No. 61/129,226, filed on Jun. 12, 2008.

(51) Int. Cl.
*F03B 13/20* (2006.01)
*F03B 13/18* (2006.01)

(52) U.S. Cl.
CPC ............. *F03B 13/20* (2013.01); *F03B 13/1885* (2013.01); *Y02E 10/38* (2013.01)
USPC .......................................................... 290/53

(58) Field of Classification Search
CPC ...... F03B 13/1825; F03B 13/20; Y02E 10/38
USPC ........ 290/42, 53; 60/495, 496, 497, 498, 500, 60/501, 502, 504, 505; 417/330, 331, 332, 417/333
See application file for complete search history.

(56) References Cited

U.S. PATENT DOCUMENTS

| | | | | |
|---|---|---|---|---|
| 628,457 A | * | 7/1899 | Gehre | 290/42 |
| 735,510 A | * | 8/1903 | Hergenhan et al. | 60/501 |
| 1,018,678 A | | 2/1912 | Nelson | |
| 3,887,817 A | * | 6/1975 | Steelman | 290/43 |
| 4,092,828 A | | 6/1978 | Garza | |
| 4,108,578 A | | 8/1978 | Corey | |
| 4,124,182 A | * | 11/1978 | Loeb | 244/153 R |
| 4,228,360 A | * | 10/1980 | Navarro | 290/43 |
| 4,340,821 A | | 7/1982 | Slonim | |
| 4,389,843 A | * | 6/1983 | Lamberti | 60/507 |
| 4,392,061 A | * | 7/1983 | Dubois et al. | 290/53 |
| 4,434,375 A | | 2/1984 | Taylor | |
| 4,447,740 A | | 5/1984 | Heck | |
| 4,469,955 A | * | 9/1984 | Trepl, II | 290/53 |
| 4,781,023 A | * | 11/1988 | Gordon | 60/506 |

(Continued)

*Primary Examiner* — Pedro J Cuevas
*Assistant Examiner* — S. Mikailoff
(74) *Attorney, Agent, or Firm* — Shlesinger, Arkwright & Garvey LLP

(57) ABSTRACT

A wave action electric generating system comprises a platform floating on water, the platform being subject to rocking from side to side from wave action; an electric generator disposed on the platform; a pulley engagable with the generator in a first direction to power the generator, and freewheeling with the generator in a second direction opposite the first direction; a spring to rewind the cable; an arm extending over the water, the arm including a far end that moves substantially up and down over the water as the platform rocks from side to side; a cable operably connected to the pulley and supported by the far end, the cable pulling on the pulley in the first direction and rewinding around the pulley in the second direction; a member disposed in the water and connected to another end of the cable, the member resisting lifting as the far end moves upwardly from wave action thereby to unwind the cable and drive the generator, the member resisting sinking as the far end moves downwardly, thereby to rewind the cable.

14 Claims, 10 Drawing Sheets

(56) References Cited

U.S. PATENT DOCUMENTS

| | | | |
|---|---|---|---|
| 4,843,250 A | 6/1989 | Stupakis | |
| 4,851,704 A | 7/1989 | Rubi | |
| 4,931,662 A * | 6/1990 | Burton | 290/42 |
| 5,066,867 A | 11/1991 | Shim | |
| 5,136,173 A | 8/1992 | Rynne | |
| 5,394,695 A | 3/1995 | Sieber | |
| 5,549,445 A | 8/1996 | Schremp | |
| 5,789,826 A | 8/1998 | Kumbatovic | |
| 5,921,082 A * | 7/1999 | Berling | 60/325 |
| 5,929,531 A | 7/1999 | Lagno | |
| 6,109,029 A * | 8/2000 | Vowles et al. | 60/398 |
| 6,681,572 B2 | 1/2004 | Flory | |
| 6,768,217 B2 | 7/2004 | Chalmers et al. | |
| 7,042,112 B2 | 5/2006 | Wood | |
| 7,199,483 B2 | 4/2007 | Lomerson, Sr. et al. | |
| 7,315,092 B2 | 1/2008 | Cook | |
| 7,459,802 B2 * | 12/2008 | Loui et al. | 290/53 |
| 8,446,034 B1 * | 5/2013 | Stevens | 290/55 |
| 8,450,870 B1 * | 5/2013 | Stevens | 290/54 |
| 2007/0257490 A1 * | 11/2007 | Kornbluh et al. | 290/53 |
| 2008/0016860 A1 | 1/2008 | Kornbluh et al. | |
| 2008/0122225 A1 | 5/2008 | Smith | |
| 2011/0042954 A1 * | 2/2011 | Werjefelt | 290/53 |

* cited by examiner

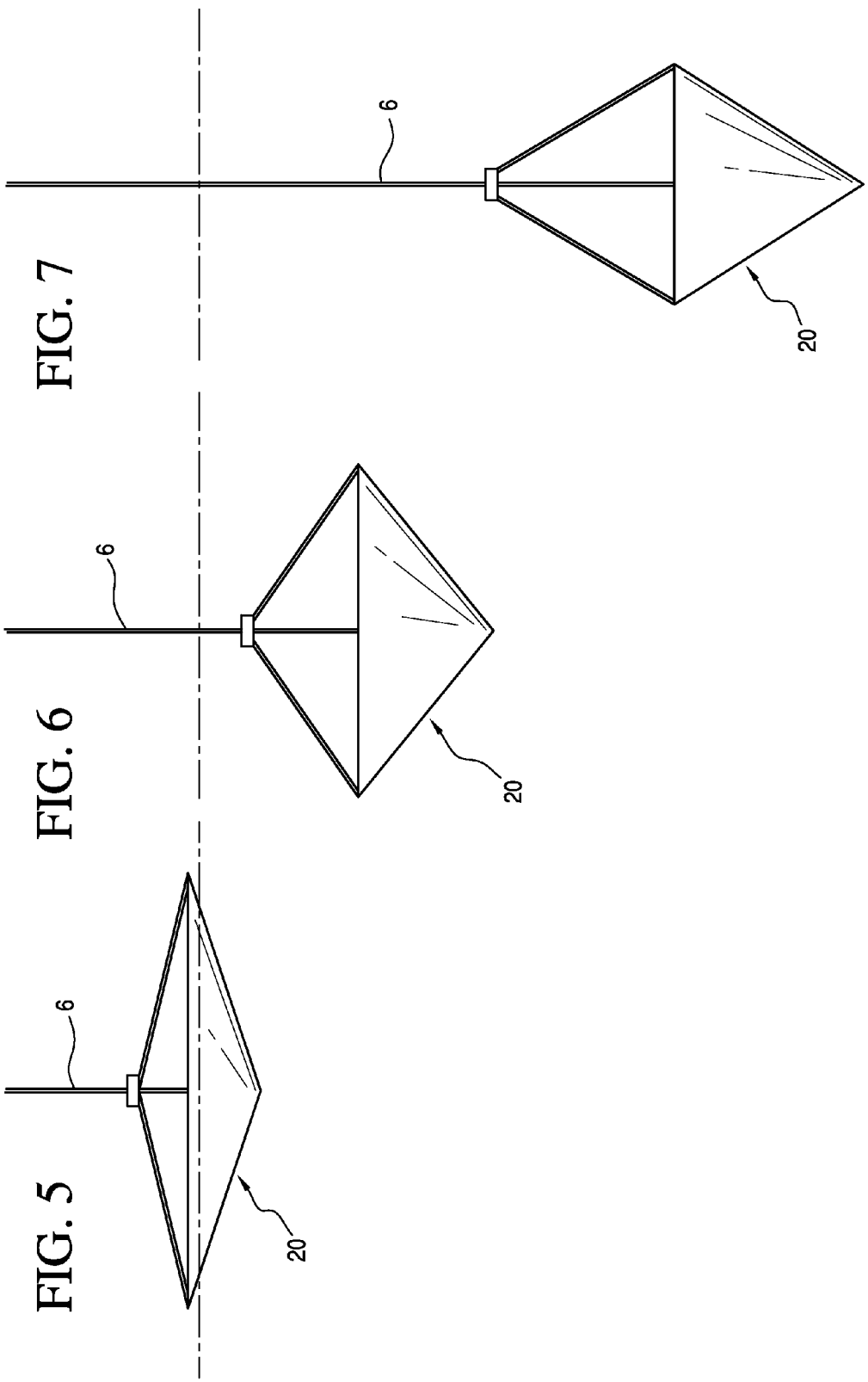

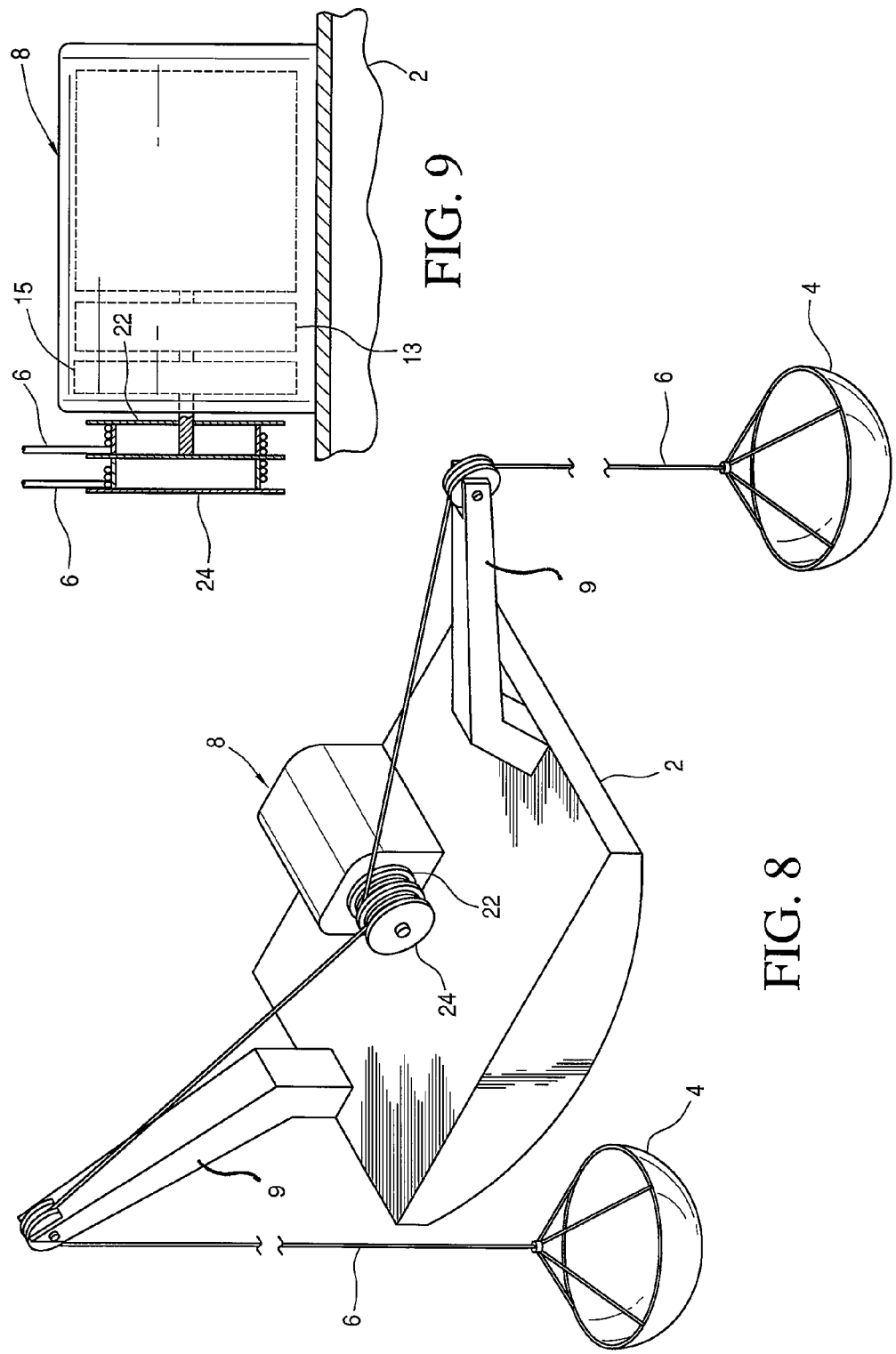

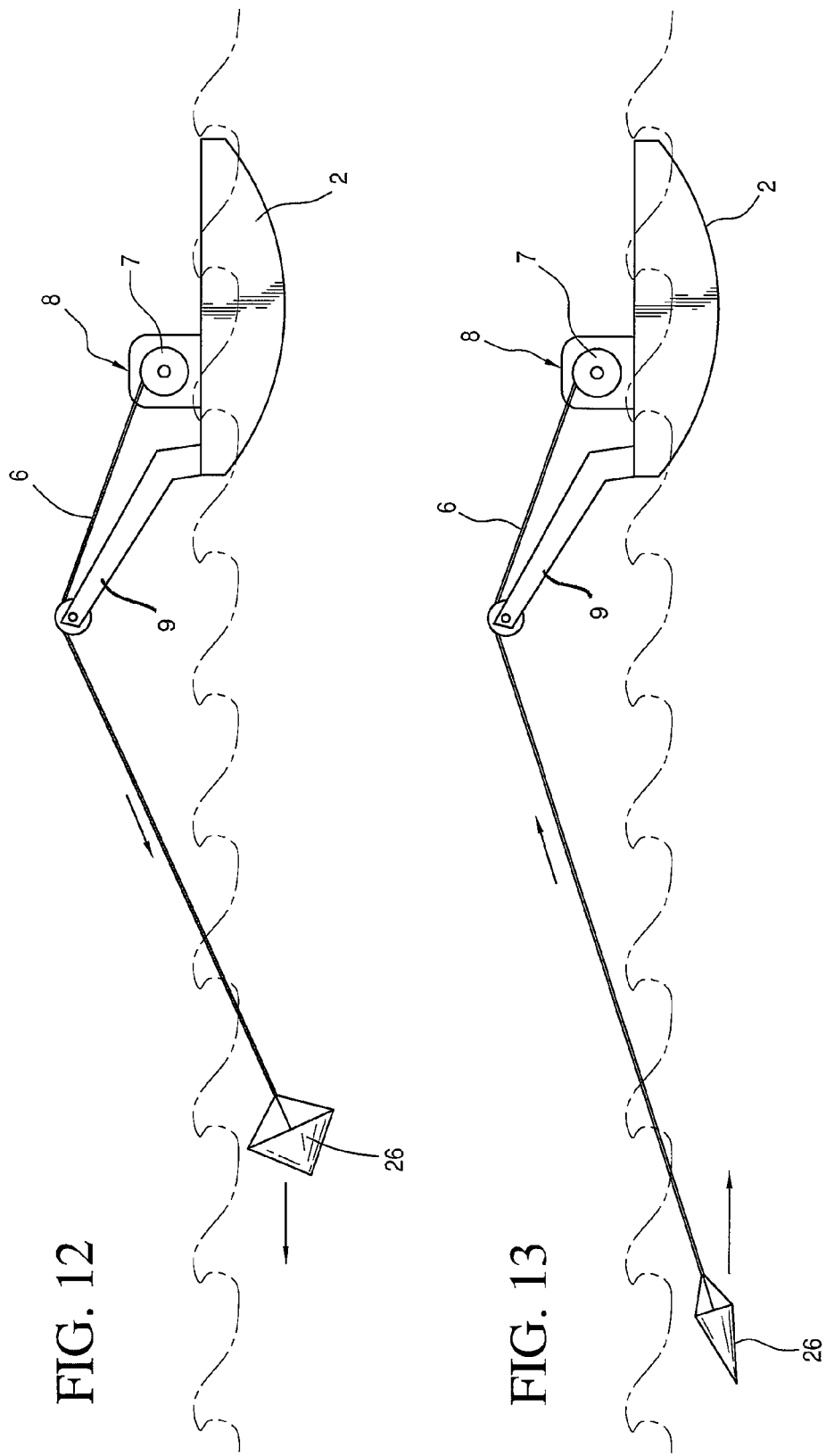

WAVE ACTION ELECTRIC GENERATING SYSTEM INCLUDING A BOOM ON A FLOATING PLATFORM

RELATED APPLICATION

This is a nonprovisional application claiming the benefit of provisional application Ser. No. 61/129,226, filed Jun. 12, 2008, herein incorporated by reference.

FIELD OF INVENTION

The present invention is generally directed to wave action electric generating systems and in particular to a wave action electric generating system that harnesses the rocking motion of a floating platform.

SUMMARY OF THE INVENTION

A floating platform uses a device which provides drag when pulled through water, which is connected via cables, pulleys, and/or hydraulic or pressurized means to convert wave energy into electric energy. The rocking/pulling motion of the platform in rough seas allows the drags to exert a pulling force on the cables/hydraulic lines connected to the generator.

A wave action electric generating system comprises a platform floating on water, the platform being subject to rocking from side to side from wave action; an electric generator disposed on the platform; a pulley engagable with the generator in a first direction to power the generator, and freewheeling with the generator in a second direction opposite the first direction; a spring to rewind the cable; an arm extending over the water, the arm including a far end that moves substantially up and down over the water as the platform rocks from side to side; a cable operably connected to the pulley and supported by the far end, the cable pulling on the pulley in the first direction and rewinding around the pulley in the second direction; a member disposed in the water and connected to another end of the cable, the member resisting lifting as the far end moves upwardly from wave action thereby to unwind the cable and drive the generator, the member resisting sinking as the far end moves downwardly, thereby to rewind the cable.

BRIEF DESCRIPTION OF THE DRAWINGS

FIG. 4 is a schematic side elevational view of a pulley/generator arrangement, with portions shown in cross-section.

FIGS. 5-7 are schematic side elevational views of a drag member that changes its configuration, generating more or less drag, depending on the direction of pull, as it moves through the water.

FIG. 8 is a schematic perspective view of another embodiment of the present invention.

FIG. 9 is a schematic side elevational view of a pulley/generator arrangement used in the system of FIG. 8, with portions shown in cross-section.

FIG. 12 is a schematic side elevational view of another embodiment of the present invention, showing the drag member being pulled out due to water currents.

FIG. 13 is a schematic side elevational view of the embodiment of FIG. 11, showing the drag member being pulled in by a rewinding mechanism, with the drag member collapsed to present minimum drag.

DETAILED DESCRIPTION OF THE INVENTION

Figure 1:
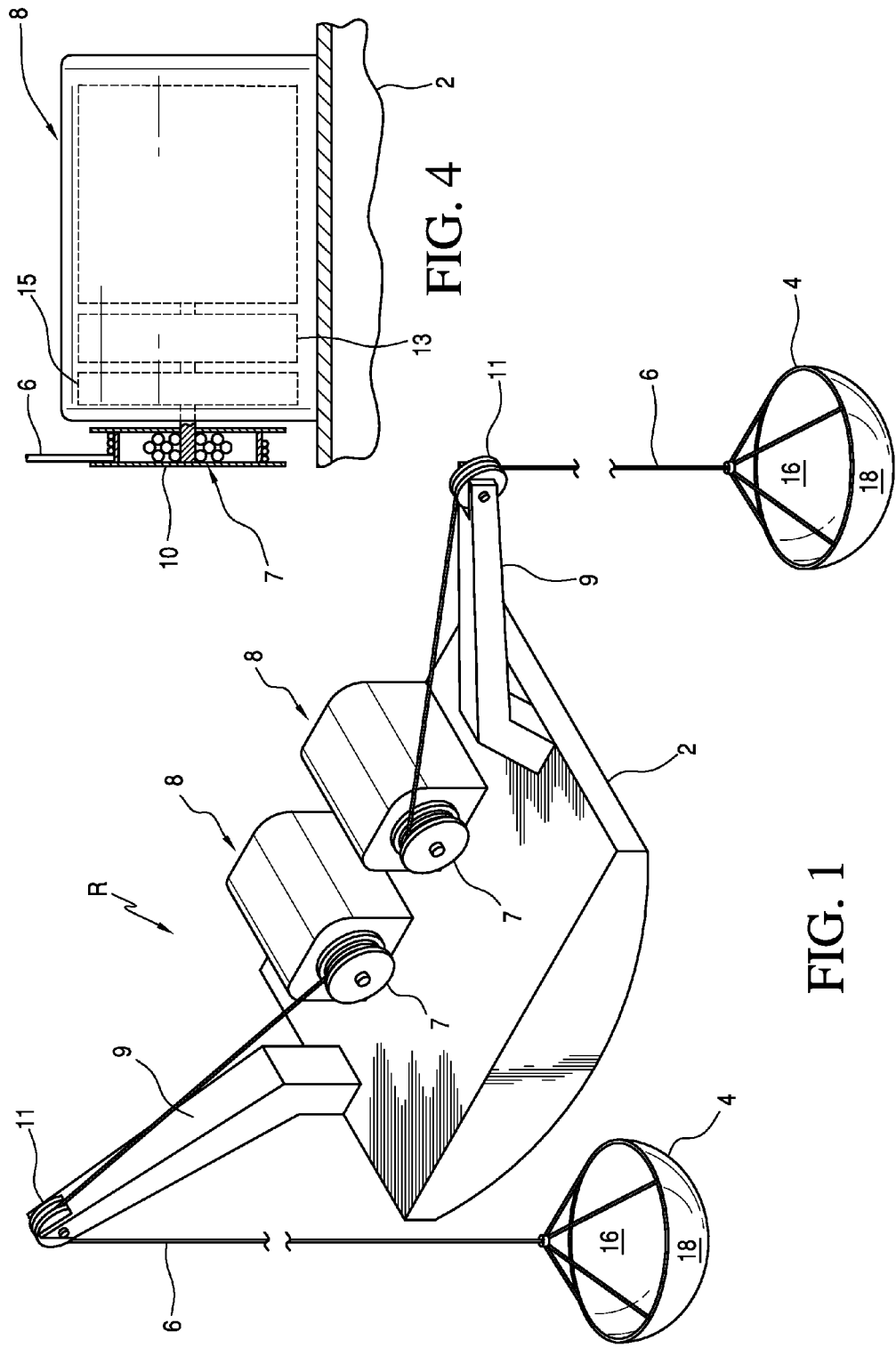
FIG. 1 is schematic perspective view of a wave action electric generator made in accordance with the present invention.

A wave action electric generating system R is disclosed. A floating platform 2, such as a barge, boat etc. includes drag members 4 designed to provide drag when being pulled through fluid. These drag members 4 are attached to high strength cable 6 and/or hydraulic lines or levers, which in turn are connected to a pulley 7 connected to the shaft of a generator 8. Booms or arms 9 extend over the water to guide the cable 6. Pulleys 11 allow the cables 6 to change direction as they course from the generators 8 to the drag members 4. The generators 8 are equipped with flywheels 13 to even out the rotational energy imparted by the cables 6. A single or multitude of these structures could be rigged to a single or multiple generators.

When the cable 6 is pulled out (when the floating structure moves upward by way of wave movement), the pulley 7 spins and turns the generator shaft, which exerts force on the generator. When the pulling ceases (when the floating structure begins its downward motion) a spring 10 recoils the cable 6 by counter rotating the pulley 7 to rewind the cable 6. The pulley 7 is connected to the generator shaft through a one-way clutch 15 such that the shaft rotates only in one direction but not in the opposite direction. Specifically, the shaft does not turn when the pulley 7 is rewinding from the force of the spring 10, as shown in FIG. 4. An example of the one-way clutch 15 is a mechanism found in a standard ratchet wrench where force can be exerted in one direction while able to spin freely in the other rotational direction. The one-way clutch 15 may also be electrically operated, wherein the clutch is engaged when rotating in one direction, but electrically disengaged when the reverse direction is sensed. The recoiling mechanism allows the cable 6 to rewind itself so the process can repeat itself. With the use of the one-way clutch 15, force is exerted on the generator in one direction by way of the dragging force of the drag members 4 on the cables 6, and force from the spring 10 is used to rewind the cable 6 without turning the generator. The one-way clutch 15 also allows the flywheel 13 to continue to rotate while the cable 6 is rewinding or the pulley 7 is stopped.

Figure 2:
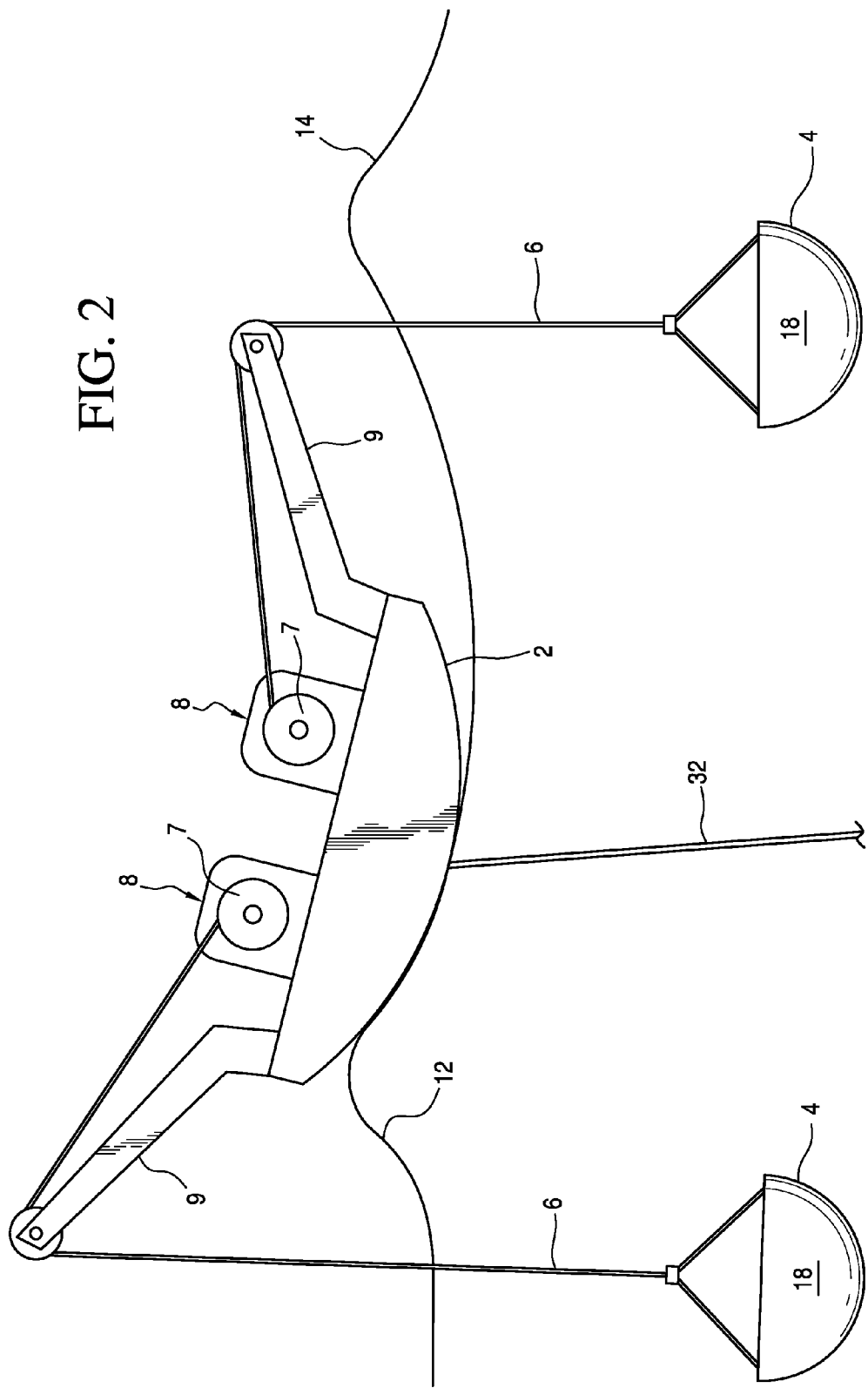
FIG. 2 is a side elevational view of FIG. 1, showing the platform tilting to the right due to wave action.
Figure 3:
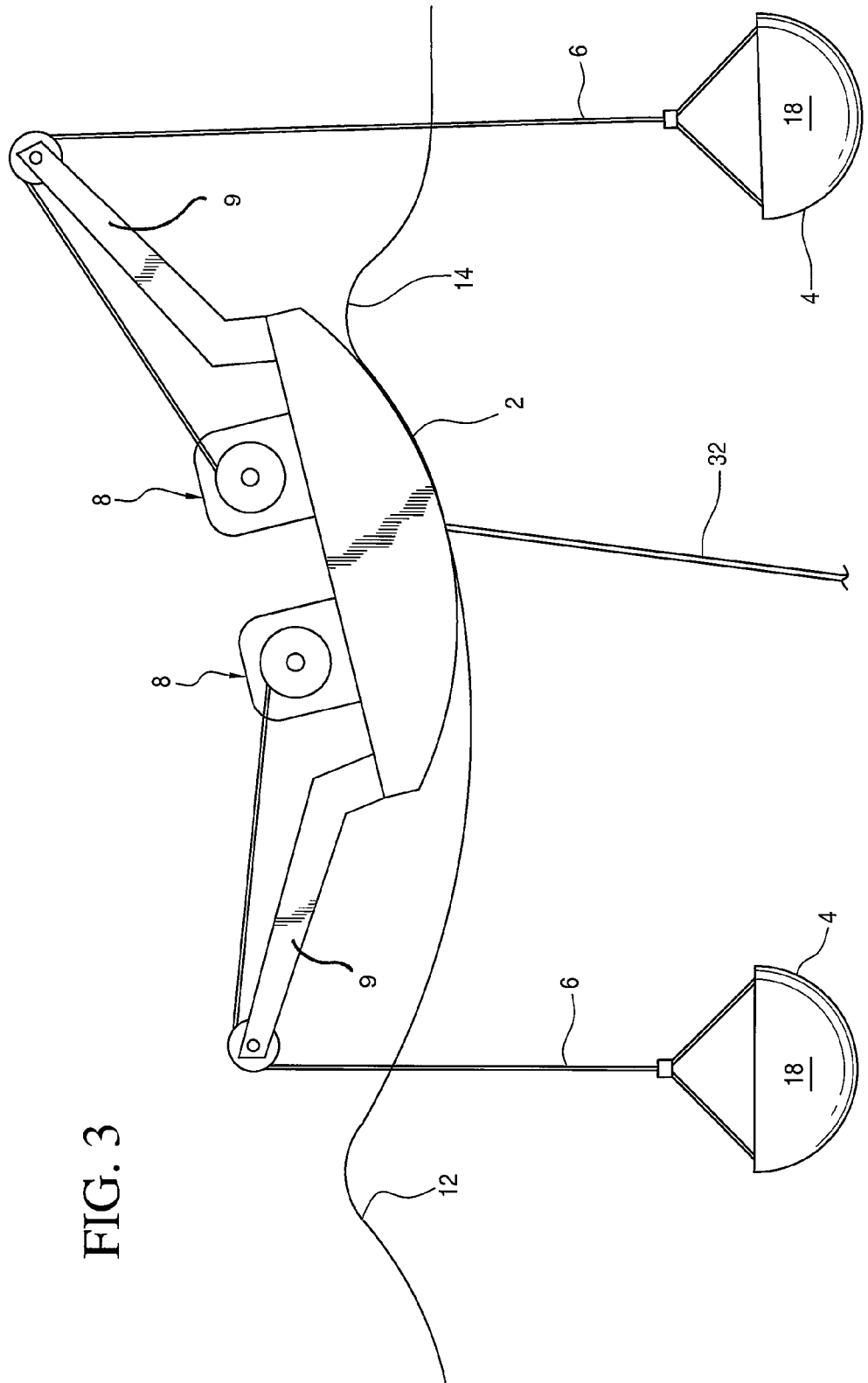
FIG. 3 is a side elevational view of FIG. 1, showing the platform tilting to the left due to wave action.

Referring to FIGS. 2 and 3, during operation, a wave 12 causes the platform 2 to tilt toward the right of the page, causing the right cable 6 to rewind, without exerting any torque on its associated generator shaft, while the cable 6 on the left exerts a turning force on the generator crankshaft, thereby generating electricity. As the wave 12 passes through, another wave 14 moves in, causing the platform to tilt toward the left of the page, thus causing the cable on the right to exert a torque on the associated generator 8, while the cable on the left rewinds, without causing any turning force on its associated generator 8.

The floating platform 2 is designed to maximize the natural rocking motion imparted by the waves, allowing for the maximum amount of flux in any given wave conditions. Thus the bottom could be rounded, flat, or angled. The structure 2 could be built to maximize size and weight, for added inertia, or minimized to minimize inertia, depending on the prevalent wave conditions. A heavy large platform 2 could exert great pressures on relatively large drags, in large waves, while a lighter more buoyant platform could be optimal for smaller waves.

The more the edges of the platform rock the more power can be generated by the generators 8. Thus the structure 2 should be designed to maximize its natural instability. However the drag members 4 counter this instability. Relative stability of the platform could be adjusted by the amount of torque power allowed to be exerted on the crankshaft. The more torque power allowed upon the crankshaft, the more stable the platform. Less torque could yield more instability. The electric output is determined by the size of the waves/swell, the size of the drags, the frequency of cable pulls per given unit of time, and the amount of torque exerted on the generator crankshaft (determined in part by float mass and buoyancy).

The drag members 4 contain a certain level of counter-resistance to water pressure when sinking. Referring to FIG. 1, each of the drag members 4 is hollow member that fills up with water, and presents a large internal surface 16 to the water as the cable 6 tries to lift it up as the platform tilts to the right, in the case of the drag member 4 on the left, as shown in FIG. 2. The larger the horizontal projection of the internal surface 16 to the direction of motion of the cable, the greater the drag force. The curved surface of the internal surface 16 also provides a stabilizing effect to the drag member 4 due to the water deflecting off the curved surface 16 as the cable 6 tries to lift up the drag member.

The outside surface 18 provides a counter-resistance to the water as the drag member 4 sinks, as indicated for the drag member 4 on the right side of FIG. 2. This is needed for the re-coil spring 10, so the recoil can take place with little or no energy.

Referring to FIGS. 5-7, another embodiment of the drag member is disclosed. The drag member 20 is shaped like an inverted umbrella. In this case, when the umbrella shaped drag member 20 is pulled on, the drag member 20 opens up progressively, as shown in FIGS. 4-6, and resists the upward movement. When sinking, the drag member 20 also resists the sinking motion as well (to a lesser extent).

The drag members could be situated such that they sit deep in the water, or near the surface. If near the surface, and if pulled above the water line, the weight of the water held within the drag member will pull the drag member back into the water (based on the setting of the torque on the rewind device). This is one way to provide the most torque power with the smallest size drag member, since pulling water above the water line exerts more power than merely dragging through the water.

Figure 10:
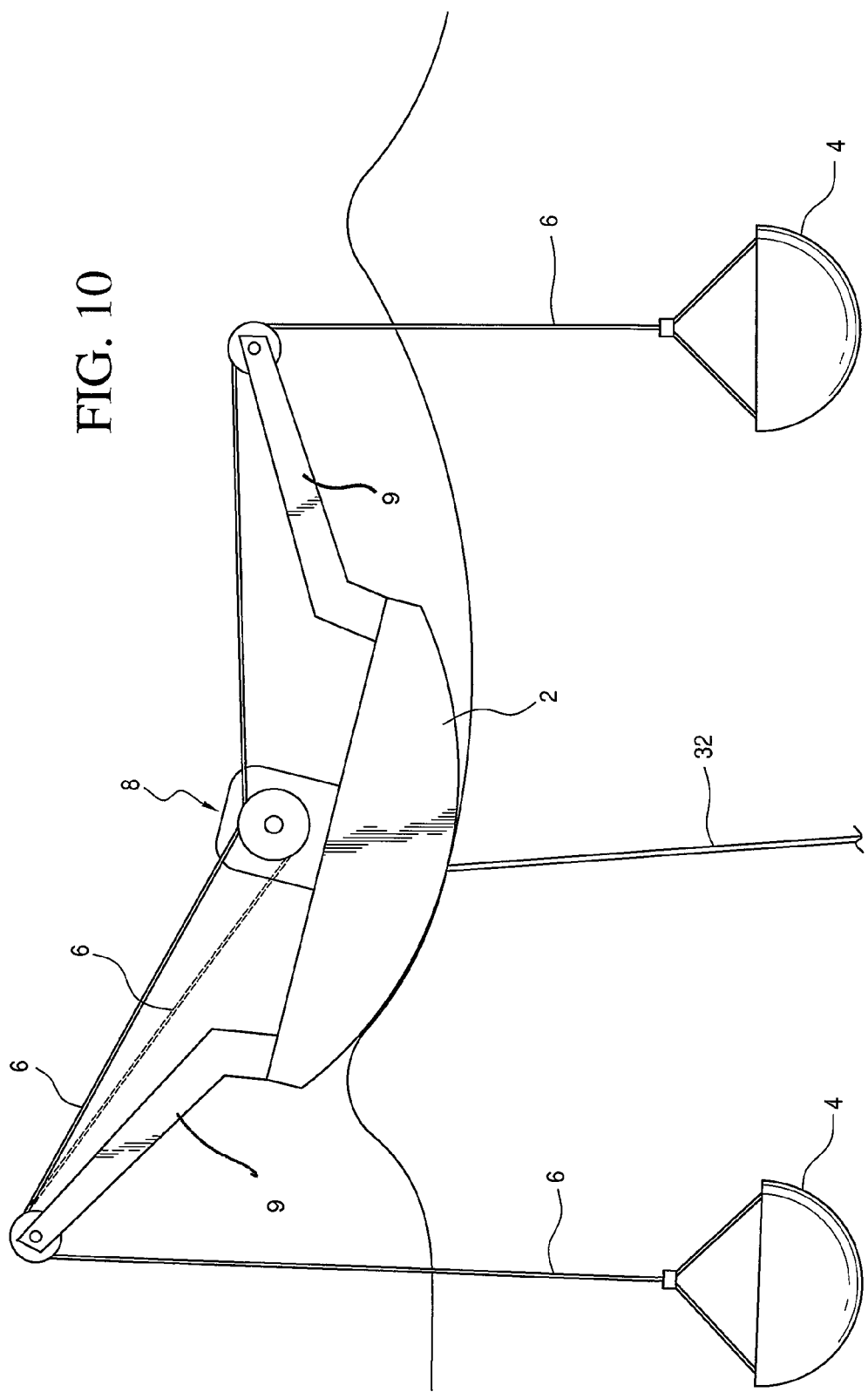
FIG. 10 is a side elevational view of FIG. 8, showing the platform tilting to the right due to wave action.
Figure 11:
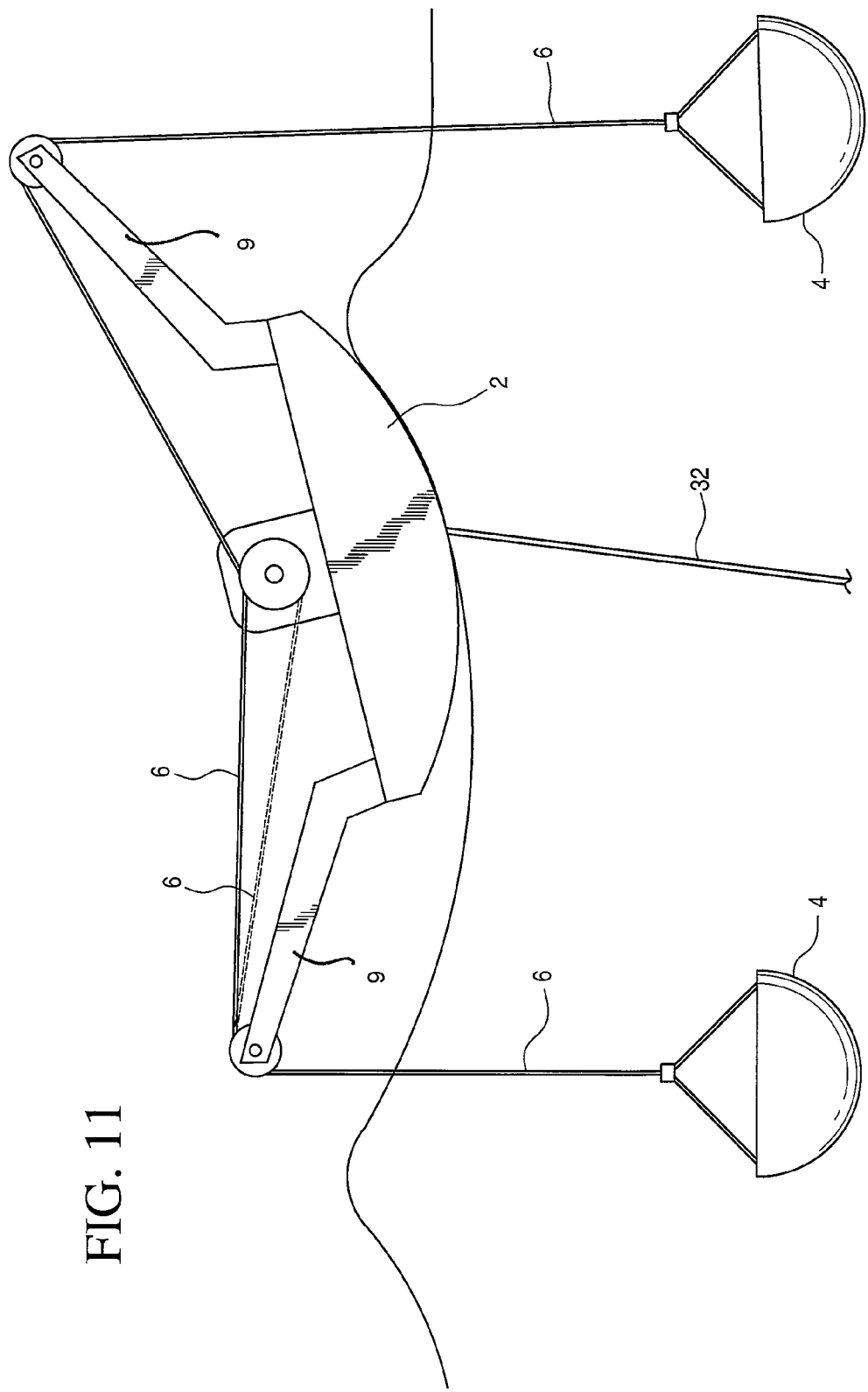
FIG. 11 is a side elevational view of FIG. 8, showing the platform tilting to the left due to wave action.

In another embodiment, the system disclosed in FIG. 1 is modified so that both the left and right drag members are connected to a single generator 8, as shown in FIG. 8. The cables are connected to two pulleys 22 and 24, as shown in FIG. 9. The pulleys are arranged so that one of the drag members 4 is used to drive the generator, while the other drag member is used to rewind the cable. The pulleys are connected to the generator shaft through the one-way clutch 15 that allows rotation of the shaft only in one direction. In this embodiment, the recoil spring is eliminated. Referring to FIGS. 10 and 11, the right hand drag member 4 may be used to turn the generator 8, while the drag member on the left is used to rewind the cable of the right hand cable. In FIG. 10, the cable on the left is extended after rewinding the cable on the right. As the platform 2 tilts to the left, as shown in FIG. 11, the cable on the right extends, causing the generator shaft to turn, while rewinding the cable on the left, which is then ready to rewind the cable on the right as the platform tilts to the right.

Figure 15:
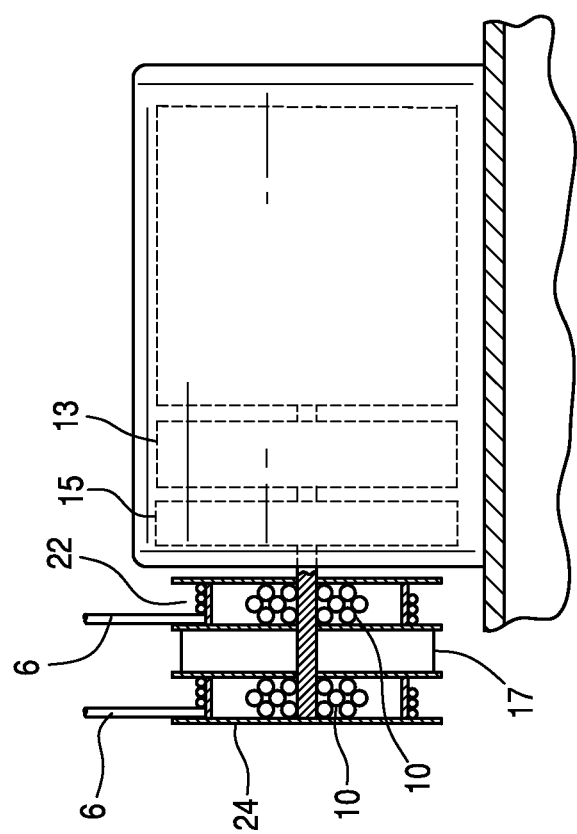
FIG. 15 is a schematic side elevational view of a pulley/generator arrangement in accordance with another embodiment of the present invention, with portions shown in cross-section

The system can also be arranged such that two drag members 4 are connected to the pulleys 22 and 24 with each pulley having their own one-way clutches 15 and 17 and rewind spring 10 that allows each pulley to rewind independently of the other pulley, as shown in FIG. 15. The cables 6 on the right and left hand of FIG. 10 will be arranged such that when torque is applied by either cable on the generator, the shaft is rotated only in one direction. Both cables on the right and left will be wound in the same direction on the associated pulleys 22 and 24. The left hand side cable 6 shown in dashed lines in FIGS. 10 and 11 is wound around its pulley in the same direction as the right hand cable 6 such that either cable will be imparting torque to the generator in the same direction. As the cable 6 on the right is extending, as shown in FIG. 10, imparting torque to the generator, the cable 6 on the left hand side would be rewinding. In the same manner, as the cable on the left hand side is extending to drive the generator, the cable 6 on the right is rewinding. In this manner, the left and right side drag members 4 are effective in imparting torque to the generator.

Another embodiment of the present invention includes drag members that incorporate a mechanism as part of the drag cable, that alters the degree to which the walls of the drag members are set, and thus the amount of drag they produce. This may be necessary in order to keep the cable centered or positioned at a preferred depth, and to provide a preferred amount of drag/back pressure etc, as well as maintain a limited amount of line to be drawn out.

Another embodiment of the present invention is disclosed in FIGS. 12 and 13. A parachute-like drag member 26 is situated at a slight distance from the platform 2 (so as not to interfere with the vertical drags). The drag member 26 is used to minimize the pull of the platform in current and/or wind. The drag member 26 will pull out the cable 6 based on the current and wind exerted on the platform 2, as shown in FIG. 12, thereby driving the generator 8. When the drag member 26 reaches a certain distance from the platform, the drag member 26 will collapse and/or a mechanism that reduces the drag will be initiated such that the device can be recoiled by a relatively strong recoil device, such as the spring 10, as shown in FIG. 13.

Figure 14:
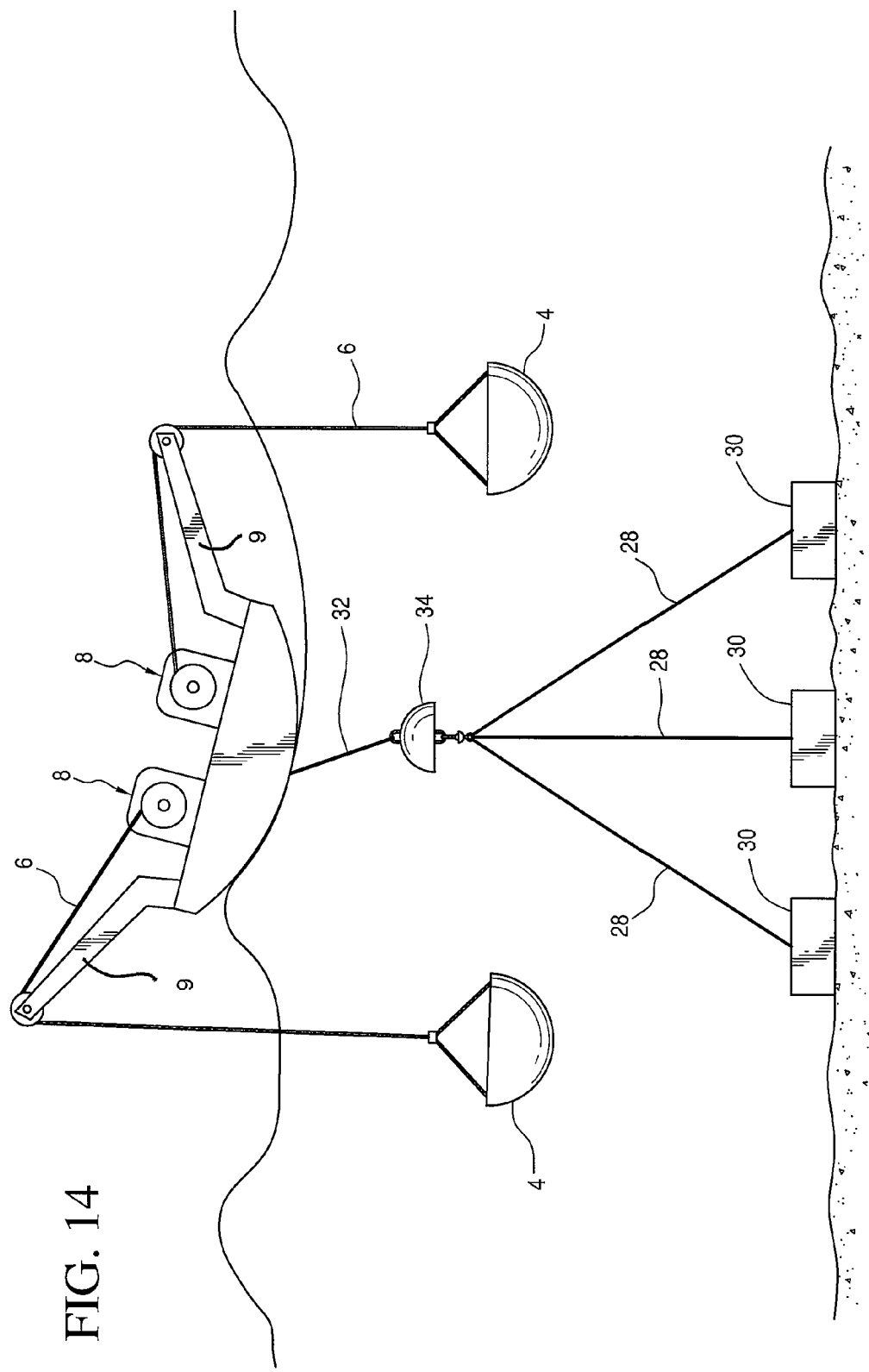
FIG. 14 is a schematic side elevational view of FIG. 1, showing the system anchored to the sea bottom.

Referring to FIG. 14, the system R is shown anchored to the bottom of the sea with cables 28 tied to anchors 30 and cable 32 tied to a pivoting ball 34.

Advantageously, the various embodiments of the present invention can be used to great avail and easy implementation on boats. Boats currently incorporate drag structures to stabilize boats, and parachutes to keep boats from drifting too much. The present invention provides the means to extract the energy from such devices.

The system disclosed herein is not only potentially capable of creating an immense amount of electricity for use on an industrial scale, but it also can provide stability for the platform such that it may be of commercial interest for use in fish-farming or other open ocean ventures.

The present invention disposes the majority of its components that may need to be maintained or replaced above the water and on the floating platform for easy accessibility. Whereas many previous wave action generator designs, have critical components located underwater, the present invention has critical components, such as the generators, above the water.

The present invention makes use of the dynamic, oscillating movement that a platform undergoes in oceanic or turbulent waters. When incorporating a multitude of these devices on one floatation device, one can effectively harvest the energy exerted on each side/area of the platform, in effect also making angled movements (of the platform as a whole) useful for energy extraction as well. If for example, one has a square floatation barge, and a wave hits a certain corner of a the barge, that corner in itself is generating electricity by way of the aforementioned method, before the wave passes to the remainder of the barge and as each station lifts each station cranks a generator, or a central generator.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A wave action electric generating system, comprising:
    a) a platform for floating on water, said platform being subject to rocking from side to side from wave action;
    b) a first electric generator disposed on said platform;
    c) a first pulley engagable with said first generator in a first direction to drive said first generator, and disengagable with said first generator in a second direction opposite the first direction;
    d) a first spring to drive said first pulley in said second direction;
    e) a first boom carried by said platform, said first boom extending upwardly from said platform and over the water, said first boom including a far end that moves substantially up and down over the water as said platform rocks from side to side;
    f) a first cable having one end operably connected to said first pulley and rotatably supported by said far end of said first boom, said first cable pulling on and unwinding from said first pulley in said first direction and rewinding around said first pulley in said second direction;
    g) a first drag member for being disposed in the water and connected to another end of said first cable, said first drag member resisting lifting as said far end of said first boom moves upwardly from wave action to allow said first cable to pull on and unwind from said first pulley in said first direction to power said first generator, said first drag member resisting sinking as said far end of said first boom moves downwardly to allow force from said first spring to rewind said first cable around said first pulley in said second direction;
    h) a second electric generator disposed on said platform, opposite said first electric generator;
    i) a second pulley engagable with said second generator in a third direction to drive said second generator, and disengagable with said second generator in a fourth direction opposite the third direction;
    j) a second spring to drive said second pulley in said fourth direction;
    k) a second boom carried by said platform opposite said first boom, said second boom extending upwardly from said platform and over the water, said second boom including a far end that moves substantially up and down over the water as said platform rocks from side to side;
    l) a second cable having one end operably connected to said second pulley and rotatably supported by said far end of said second boom, said second cable pulling on and unwinding from said second pulley in said third direction and rewinding around said second pulley in said fourth direction; and
    m) a second drag member for being disposed in the water and connected to another end of said second cable, said second drag member resisting lifting as said far end of said second boom moves upwardly from wave action to allow said second cable to pull on and unwind from said second pulley in said third direction to power said second generator, said second drag member resisting sinking as said far end of said second boom moves downwardly to allow force from said second spring to rewind said second cable around said second pulley in said fourth direction;
    wherein said first and second generators are not mechanically coupled together so as to operate independently from one another.

2. A wave action electric generating system as in claim 1, wherein said platform has a rounded bottom surface.

3. A wave action electric generating system as in claim 1, wherein said first pulley and said second pulley each includes a one-way clutch.

4. A wave action electric generating system as in claim 3, wherein each one-way clutch includes a ratchet mechanism.

5. A wave action electric generating system as in claim 3, wherein each one-way clutch is electric.

6. A wave action electric generating system as in claim 1, wherein said first drag member and said second drag member are hollow.

7. A wave action electric generating system as in claim 1, wherein said first drag member and said second drag member are collapsible.

8. A wave action electric generating system as in claim 1, wherein said platform is anchored to a sea floor.

9. A wave action electric generating system as in claim 2, wherein said first drag member and said second drag member are collapsible.

10. A wave action electric generating system as in claim 3, wherein said first drag member and said second drag member are collapsible.

11. A wave action electric generating system as in claim 4, wherein said first drag member and said second drag member are collapsible.

12. A wave action electric generating system as in claim 5, wherein said first drag member and said second drag member are collapsible.

13. A wave action electric generating system as in claim 6, wherein said first drag member and said second drag member are collapsible.

14. A wave action electric generating system as in claim 8, wherein said first drag member and said second drag member are collapsible.

* * * * *